No. 875,117. PATENTED DEC. 31, 1907.
P. SCOTT.
ROASTING PAN.
APPLICATION FILED NOV. 25, 1905.
FIG. 1.
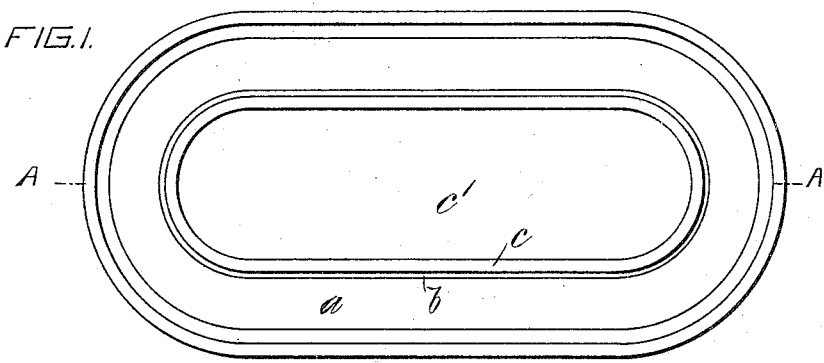
FIG. 2.
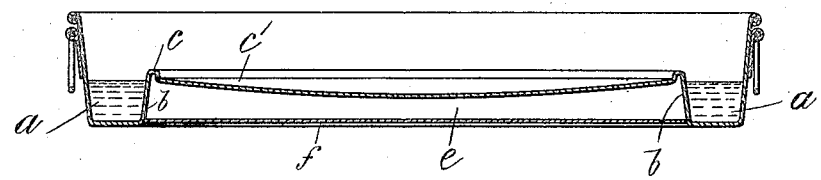
FIG. 3.
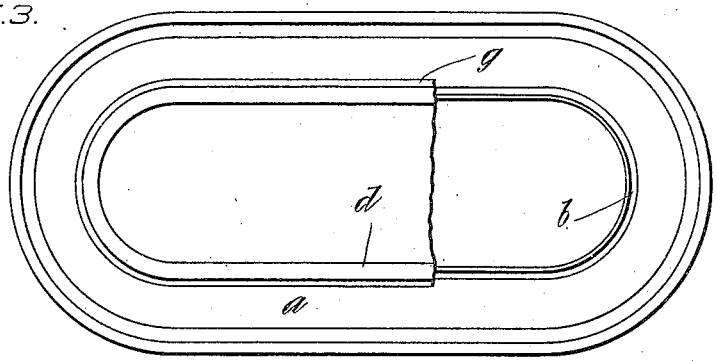
FIG. 4.
FIG. 5.
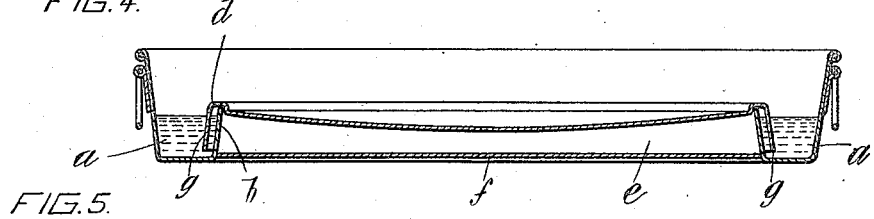
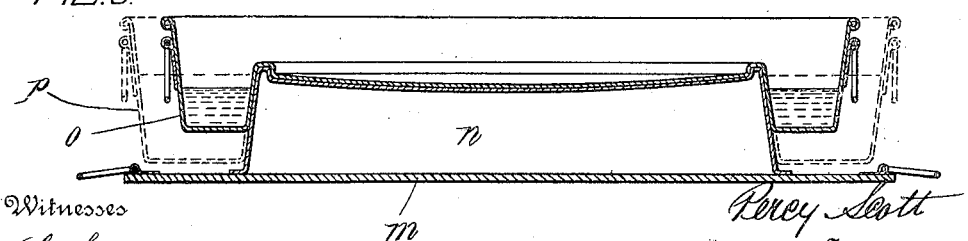
Witnesses
Percy Scott
Inventor
By Attorney

UNITED STATES PATENT OFFICE.

PERCY SCOTT, OF MONTREAL, QUEBEC, CANADA.

ROASTING-PAN.

No. 875,117.　　　　Specification of Letters Patent.　　　Patented Dec. 31, 1907.

Application filed November 25, 1905. Serial No. 289,067.

*To all whom it may concern:*

Be it known that I, PERCY SCOTT, of the city of Montreal, Province of Quebec, Canada, manager, have invented certain new and useful Improvements in Roasting-Pans; and I do hereby declare that the following is a full, clear, and exact description of the same.

My invention has for its object to provide a roasting pan in which the joint or other piece of meat or a fowl being roasted will be uniformly cooked and automatically basted while the gravy will be preserved and prevented from hardening and caking upon the pan and, consequently burning.
The invention may be said briefly to consist of the pan constructed as hereinafter described and pointed out in the claims.

For full comprehension, however, of my invention reference must be had to the accompanying drawings forming a part of this specification, in which similar reference characters indicate the same parts and wherein Figure 1 is a plan view of my improved roasting pan; Fig. 2 is a longitudinal vertical sectional view thereof taken on line A A Fig. 1; Figs. 3 and 4 are views similar to Figs. 1 and 2 and illustrating a modification of my invention, and Fig. 5 is a similar view to Fig. 2 illustrating a further modification of my invention.

The central portion of the pan is raised to present walls $b$ adapted to support a table portion $c$ having a depression $c'$ to collect the juice and liquid fat dripping from the joint or fowl being roasted, the bottom of such depression being preferably concave. This table portion may be either formed integral with the walls $b$ as shown in Figs. 1, 2 and 5 or made as at $d$ (Figs. 3 and 4).

The chamber $e$ inclosed by this raised central portion may be completely insulated by a diaphragm $f$ rigidly secured in place thus forming an insulating space; or if desired the annular bottom resting upon the floor of the oven can be relied upon for the purpose and this diaphragm dispensed with.

When the table portion is made separately it is preferably formed with a depending encircling rim $g$ of sufficient depth to extend to within close proximity of the bottom of the receptacle, $a$, to insure the space between the wall $b$ and such rim being effectively sealed by the water contained in the said receptacle.
The amount of water required depends upon the length of time necessary to cook the meat, and as some meats require more basting in a given time than others, different pans with receptacles of different capacities and different areas are provided.

A pan made according to my invention and suitable for the last mentioned purposes consists of a base $m$, formed with an insulating chamber $n$ and adapted to support interchangeable pans one of which is shown at $o$, in full lines in Fig. 5 and the other at $p$ in dotted lines in the same figure.

When a joint is being roasted upon one of my improved pans the steam rising from the water with which the receptacle, $a$, is partially or completely filled according to requirements, forms a complete envelop thus moistening or basting the joint, while the juice and liquid fat dripping therefrom are collected in the receptacle formed by the depression in the table, which when full overflows into the water receptacle. The fat being lighter than the juice will rise to the top of the receptacle $c'$ and, overflow into the water where it is purified by being boiled in such water, and when the pan is taken out of the oven the fat which naturally rises to the surface solidifies there and can be easily removed.

When the joint is cooked and removed from the pan the pure juice will be found in the receptacle $c'$ and then can either be made into sauce in the said receptacle or removed therefrom.

The density and volume of the steam enveloping the joint or fowl depends upon the area and depth of the annular body of water exposed to the hot oven gases.

What I claim is as follows:—

1. A roasting pan formed with an outer main encircling wall and a bottom, the latter having an integral central portion raised to about half the height of the main wall of the pan and formed with a concave depression therein, the space between the main wall and the wall of the central raised portion forming an encircling depression lower than the depression in such central raised portion, substantially as and for the purposes set forth.

2. A roasting pan formed with an outer main encircling wall and a bottom, the latter having an integral central portion raised to about half the height of the main wall of the pan and formed with a concave depression therein, and a plate extending across and closing the opening to the space beneath said raised central portion, the space between the main wall and the wall of the central raised portion forming an encircling depression lower than the depression in such central raised portion, substantially as and for the purposes set forth.

In testimony whereof, I have signed my name to this specification, in the presence of two subscribing witnesses.

PERCY SCOTT.

Witnesses:
WILLIAM P. McFEAT,
FRED J. SEARS.